Patented Mar. 22, 1932

1,850,562

UNITED STATES PATENT OFFICE

HEINRICH NERESHEIMER, OF LUDWIGSHAFEN-ON-THE-RHINE, AND ERNST HONOLD, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

VAT DYESTUFFS OF THE ANTHRAQUINONE-ACRIDONE SERIES AND PROCESS OF MAKING SAME

No Drawing. Application filed June 9, 1930, Serial No. 460,080, and in Germany June 21, 1929.

In U. S. Patent 995,936 coloring matters of the anthracene series are described which are obtained by treating a benzanthronyl-1-aminoanthraquinone body with a condensing agent.

Now we have found that condensation products of these series so far as they contain a free amino-group and correspond to the general probable formula:

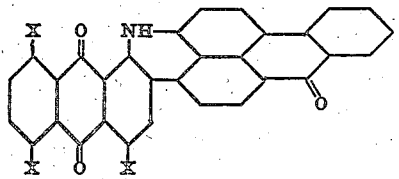

in which formula one X means an amino-group and the other X's mean hydrogen and the benzanthronyl residue may contain halogen atoms, can be converted into new valuable vat dyestuffs by heating them with an acylating agent.

As acylating agents especially chlorides and anhydrides of aliphatic and aromatic carboxylic acids are suitable. The treatment may be carried out either by a simple heating of the components or by boiling them in the presence of a higher boiling solvent or diluent with or without the addition of an acid binding agent. Chlorides and anhydrides of dicarboxylic acids, such as terephthalic acid chloride, phthalic acide anhydride and tetra-chlorophthalic acid anhydride are likewise suitable.

The new products thus obtained correspond probably to the general formula:

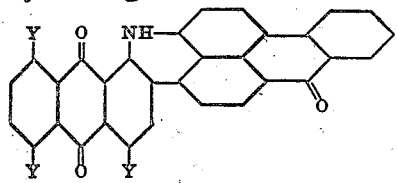

wherein one Y means the group NH-acyl and the other Y's mean hydrogen and the benzanthronyl residue may contain halogen atoms. The new products represent vat dyestuffs dyeing cotton valuable olive shades of a good fastness to chlorine.

In order to further illustrate our invention the following examples are given, the parts being by weight and all temperatures in centigrade degrees; but we wish it to be understood that our invention is not limited to the examples given, nor to the exact conditions stated therein:—

*Example 1.*—46 parts of the condensation product obtained according to U. S. Patent 995,936 by the action of an alcoholic caustic potash solution on bz - 1 - benzanthronyl - 1 - amino-5-amino-anthraquinone, are mixed with about 500 parts of nitrobenzene and 20 parts of benzoylchloride and the mixture is boiled in an apparatus provided with a stirrer and a reflux condenser. After about two hours the mass is cooled down and the separated dyestuff is filtered off and washed out. It corresponds probably to the formula:

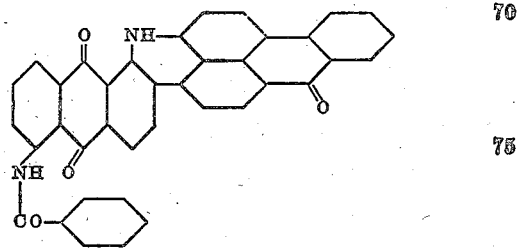

It is soluble in concentrated sulfuric acid with a green color and dyes cotton from a bluish violet vat yellow olive shades of a good fastness.

When replacing benzoylchloride by the equivalent amount of cinnamic acid chloride an analogous dyestuff of very similar properties is obtained.

The condensation may be likewise carried out with the addition of pyridine.

When starting from the condensation product obtained by acting with an alcoholic potash solution on 6-chloro-bz-1-benzanthronyl-1-amino-5-amino-anthraquinone a very similar dyestuff is obtained corresponding probably to the formula:

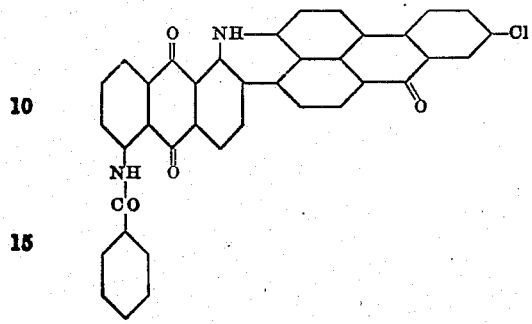

*Example 2.*—46 parts of the same starting material as used in the first paragraph of Example 1 are heated in a nitrobenzene solution with 30 parts of anthraquinone-2-carboxylic acid chloride to boiling temperature while stirring for about ½ hours. When cool the separated dyestuff is isolated and washed out. It corresponds probably to the formula:

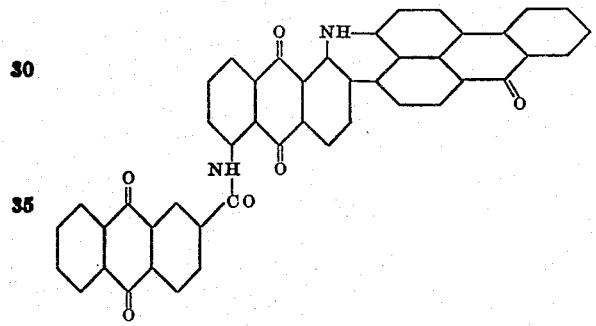

Its solution in concentrated sulfuric acid is greenish colored and the hydrosulfite vat is bluish colored, from which it dyes cotton fast yellow olive shades.

*Example 3.*—46 parts of the condensation product, used as starting material in Examples 1 and 2, are mixed with about 500 parts of nitrobenzene and 30 parts of benzoic acid anhydride and the mixture is boiled with stirring in an apparatus provided with a reflux condenser. After about two hours the formed condensation product is filtered off and washed out with benzene and alcohol. It is identical with the dyestuff of the first paragraph of Example 1.

The same dyestuff is obtained by heating 46 parts of the starting material with 140 parts of benzoic acid anhydride for about 1 hour at about 200° and removing the excess of the anhydride by extracting the reaction product with a dilute caustic soda solution.

*Example 4.*—46 parts of the starting material of all of the foregoing examples are suspended with 300 parts of acetic acid anhydride and the mixture is heated for about 3 hours in an apparatus provided with a reflux condenser. The acetylated dyestuff thus formed is filtered off and washed out with glacial acetic acid and water. It corresponds to the probable formula:

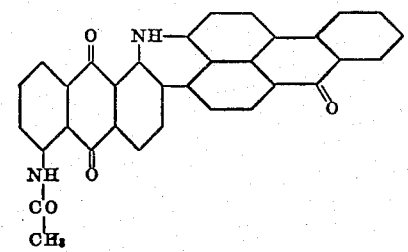

The new dyestuff is soluble in concentrated sulfuric acid with a green color and dyes cotton from a bluish violet vat olive shades of a good fastness.

*Example 5.*—50 parts of the condensation product obtained by alkaline treatment of bz-1-benzanthronyl-1-amino-8-amino-anthraquinone are boiled with 500 parts of acetic acid anhydride for about 2 hours in an apparatus provided with a stirrer and a reflux condenser. The formed dyestuff is filtered off and washed out. It corresponds probably to the formula:

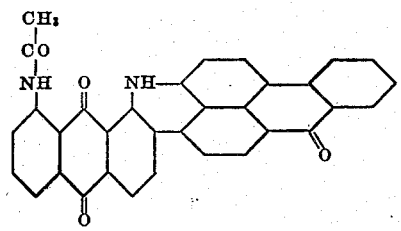

It is soluble in concentrated sulfuric acid with a green color and dyes cotton from a violet-blue vat olive shades of a good fastness to light and exposure.

*Example 6.*—50 parts of the condensation product obtained by the action of an alcoholic caustic potash solution on bz-1-benzanthronyl-1-amino-4-amino-anthraquinone are melted with 250 parts of benzoic acid anhydride for about 1 hour at about 200°. The formed dyestuff is isolated as described above. It may be purified by extraction with an organic diluent or a dilute caustic alkali solution. It corresponds probably to the formula:

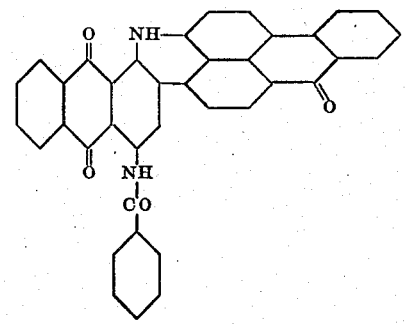

It dyes cotton from a blue vat olive shades of a particular fastness to light and exposure.

The corresponding dyestuff prepared by treating the same starting material with acetic acid anhydride dyes cotton similar olive shades.

We claim:—

1. A process for producing new vat dyestuffs which comprises heating the reaction products of alkaline condensing agents on bz - 1 - benzanthronyl-1-amino-amino-anthraquinone compounds of the probable general formula:

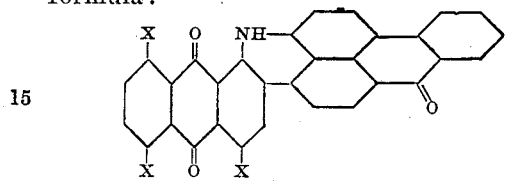

wherein one X means an amino-group and the other X's mean hydrogen and the benzanthronyl radical may contain a halogen atom in 6-position, with an acylating agent.

2. As new compounds vat dyestuffs corresponding probably to the general formula:

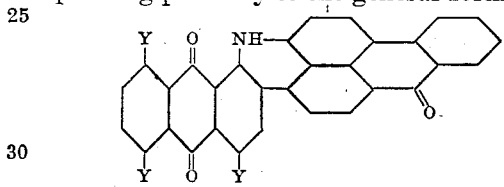

wherein one Y means the group NH-acyl and the other Y's mean hydrogen and the benzanthronyl radical may contain a halogen atom in 6-position, which dyestuffs dye cotton olive shades of a good fastness.

3. As new compounds vat dyestuffs corresponding probably to the general formula:

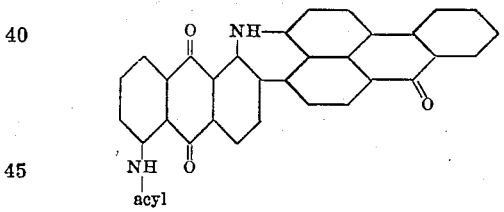

wherein the benzanthrone radical may contain a halogen atom in 6-position, which dyestuffs dye cotton olive shades of a good fastness.

4. As a new compound the vat dyestuff corresponding probably to the formula:

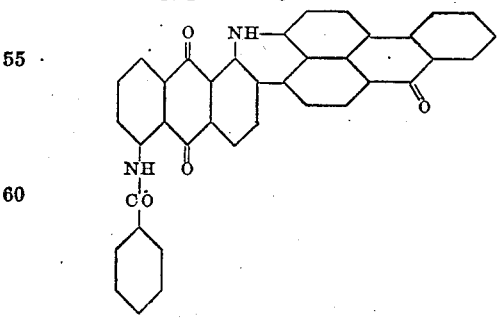

which dyestuff is soluble in concentrated sulfuric acid with a green color and dyes cotton from a bluish violet vat fast yellowish olive shades.

In testimony whereof, we affix our signatures.

HEINRICH NERESHEIMER.
ERNST HONOLD.